United States Patent [19]

Denis

[11] Patent Number: 4,519,059
[45] Date of Patent: May 21, 1985

[54] CLEANING MODE FOR DISCS OR RECORDS

[75] Inventor: Philippe V. Denis, Genappe, Belgium

[73] Assignee: Staar S. A., Belgium

[21] Appl. No.: 553,189

[22] Filed: Nov. 18, 1983

[30] Foreign Application Priority Data

Apr. 15, 1983 [BE] Belgium ............... 210,556

[51] Int. Cl.³ .................. G11B 3/58; G11B 21/02
[52] U.S. Cl. .................... 369/74; 369/72;
369/218; 369/225; 369/292
[58] Field of Search .......... 369/72, 74, 100, 117,
369/121, 122, 111, 285, 291, 292, 218, 225, 226,
229

[56] References Cited

U.S. PATENT DOCUMENTS

| 1,339,700 | 5/1920 | George. | |
|---|---|---|---|
| 2,958,529 | 11/1960 | King | 369/74 |
| 3,578,340 | 5/1971 | Fortune | 369/72 |
| 4,032,971 | 6/1977 | Camerik | 369/79 |
| 4,260,858 | 4/1981 | Beiser | 369/111 |
| 4,295,162 | 10/1981 | Carlsen | 369/111 |

FOREIGN PATENT DOCUMENTS 5337001  4/1978  Japan ................... 369/117

Primary Examiner—Steven L. Stephan
Attorney, Agent, or Firm—Leydig, Voit, Osann, Mayer and Holt, Ltd.

[57] ABSTRACT

A disc cleaning device is provided in an apparatus for transferring information to or from a disc, which apparatus includes a base, means for rotating the disc, and means for transferring information to or from the disc, the information transferring means held by an arm movably mounted on the base, the disc cleaning device comprising means for cleaning the disc mounted rotatably on the arm, means for operatively associating the disc cleaning means with a surface of the disc when the information transferring means is in an inoperative mode, and means for disassociating the disc cleaning means from the surface of the disc when the information transferring means is in an operative mode.

12 Claims, 6 Drawing Figures

CLEANING MODE FOR DISCS OR RECORDS

TECHNICAL FIELD

This invention relates to disc or record cleaning devices. More particularly, the present invention relates to disc or record cleaning devices engaged in a cleaning mode as a disc or record is introduced into disc or record recording or playback means.

BACKGROUND ART

It is generally known that the surface of a disc or record used in conventional electronic sound reproduction systems, which systems employ a motor driven turntable, tone arm and stylus, require that the surface of a record to be played be cleaned adequately to provide optimum reproduction of sounds recorded thereon and to maintain the stylus in optimum condition.

Recent advances in electronic and optical technology have resulted in the use of lasers as a means for transferring information to and from discs or records, i.e., recording or playing back information. Such systems are not limited to recording and playing back merely audio information, including music, but may also be employed as a means for storage and retrieval of video information. Such systems, known as digital systems, distinguishing them from analog record and tape systems, provide almost distortion-free sound reproduction and very high quality video reproduction. With such characterisitics, a laser information transfer system offers great potential to stimulate the home entertainment industry.

The records or discs used with these digital systems on which audio or video information is stored are known variously as digital discs, compact discs (CDs), digital audio discs, and grooveless digital discs. In contrast to conventional LP records in which the audio signal is mechanically detected from the record's groove by a stylus, a digital disc stores information by means of microscopic indentations or pits engraved in the reflective surface of the metal disc which are detected optically. A low power, narrowly focused laser beam is used to scan the rapidly spinning disc. The laser beam detects the minute indentations in the disc surface, transmitting the digital code to a digital/analog converter for conversion into an analog signal detected by a conventional amplifier. Since the optical laser system requires no direct contact between the objective lens of the laser and the disc surface for reproduction of information recorded on the disc, the surface of the disc is normally protected by a clear plastic layer, usually permanent and generally slightly greater than 1 millimeter in thickness. Although the laser beam is normally focused on the metal surface of the disc rather than on the plastic layer laminated thereto, dust and fingerprints are capable of causing some loss of efficiency of the system as a result of light scattering.

Heretofore, most record cleaning methods and devices which have been employed with analog type records have involved a manual cleaning procedure either before or after placement of a record on a turntable or the use of a device for cleaning a record after placement on a turntable. Several devices are known in the art in which an arm, pivotal at one end, has a cleaning pad or brush attached to the free end. In operation the pivotal arm is manually placed on the record. In another device, a brush or cleaning pad is attached directly to the tone arm of a record player. In each of these devices the record is cleaned during a playback mode. Such devices, although somewhat effective in cleaning a record or compact disc, are capable of exerting a drag on the disc rotating mechanism and thereby distorting the character of the information rendered in a playback mode.

DISCLOSURE OF INVENTION

The present invention relates to a device for automatically cleaning a record or disc, either analog or digital, after it has been introduced into or positioned on an apparatus for transferring information to or from a disc, such as an analog information reproduction system or laser information reproduction system or recorder system. The device of the present invention seeks to complete the disc cleaning operation prior to retrieval or playback of the information recorded on the disc and, thereby, to avoid any drag on the disc rotating mechanism which would cause distortion of the information as it is rendered audible or visual.

Another purpose of the disc cleaner of the present invention is to provide a disc cleaning device which is carried by the means or arm which bears the information transferring means and in which the cleaning phase is completed prior to the information transferring phase. Such a mode of operation and device contrasts with known disc cleaning devices which use the same arm to carry both the information transferring means and the cleaning means and in which both the cleaning and information transfer phases are conducted simultaneously.

In Applicant's Belgian Pat. No. 895,468, a cleaning device is described which is powered by the drive means for rotating the record, specifically the spindle or shaft projecting from the motor. The device to which the present invention relates is distinguished from the latter invention in that means are provided whereby the cleaning of the record is effected after the record has been introduced into or positioned in the recording apparatus, the disc cleaning means being controlled by the device for reproducing or recording the information.

In a practical embodiment of the invention, the cleaning means is mounted on the device for reproducing and recording the information carried by the record and is movable between an operative position and an inoperative position.

The present invention also seeks, in an information transferring apparatus employing a laser, to provide a means of covering the beam emitting end, or objective lens, of the laser during a cleaning phase.

BEST MODE FOR CARRYING OUT THE INVENTION

Details of the present invention will be apparent from the following description of several preferred embodiments with reference to the accompanying drawings. The invention is not to be construed in any way as being limited to the described or illustrated embodiments.

Figure 3:
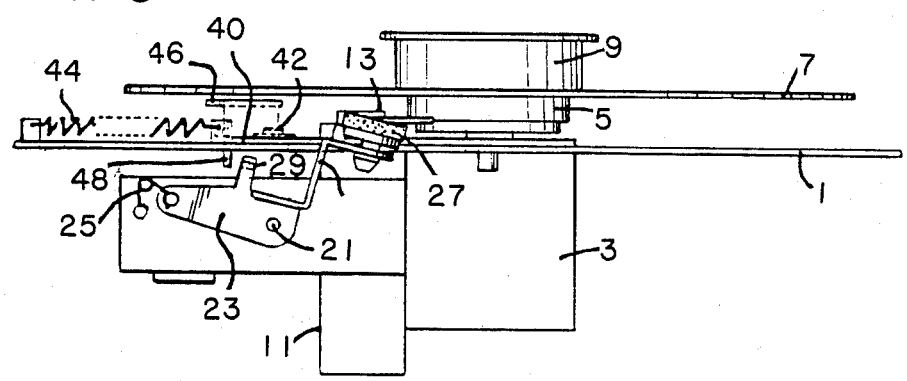
FIG. 3 is a side elevation as viewed from line III—III in FIG. 2.

The embodiment depicted by the drawings essentially comprises a chassis or base 1 to which there is affixed a means for rotating a record, such as a motor 3. The record or disc 7 is supported by a plate 5, such as a turntable, rigidly connected to the shaft of the motor 3. If a conventional analog system with a stylus is used, this may be sufficient support for the record or disc, particularly if the cleaning means is applied on the same side as the stylus, i.e., from above. However, if a laser recording or reproduction system is used and the laser beam impinges on the same side of the disc as the cleaning means, i.e., generally from below as shown in FIG. 3, a disc securing means 9, such as a magnet, may be used. Also, in an analog system in which a stylus and cleaning means are applied from above, the supporting member 5 may have a diameter larger than a standard LP record 7.

In the form of the embodiment illustrated in the drawings and described herein, the reproduction and/or recording means consists of a laser 13 mounted on a movable balanced arm 15 which can pivot about a pin 17 fixed to the chassis 1. The pivoting of the arm 15, which permits displacement of the laser 13, is controlled by a magnetic field, the characteristics of which are modified by the circuits of the reproduction and/or recording apparatus. This apparatus, having no immediate connection with the subject matter of the present invention, will neither be described nor illustrated further.

Figure 4:
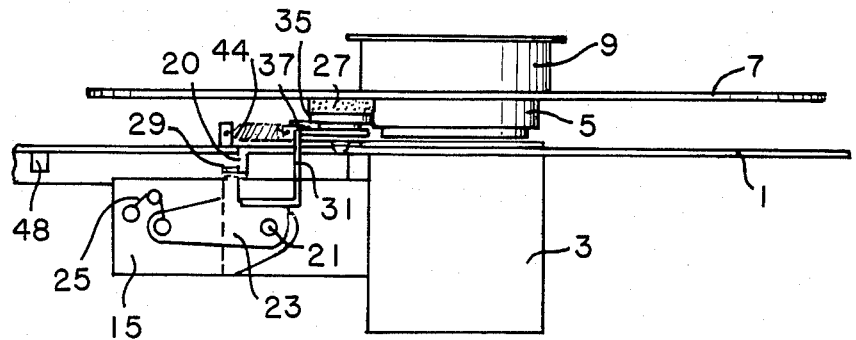
FIG. 4 is a side elevation as viewed from line IV—IV in FIG. 1.
Figure 5:
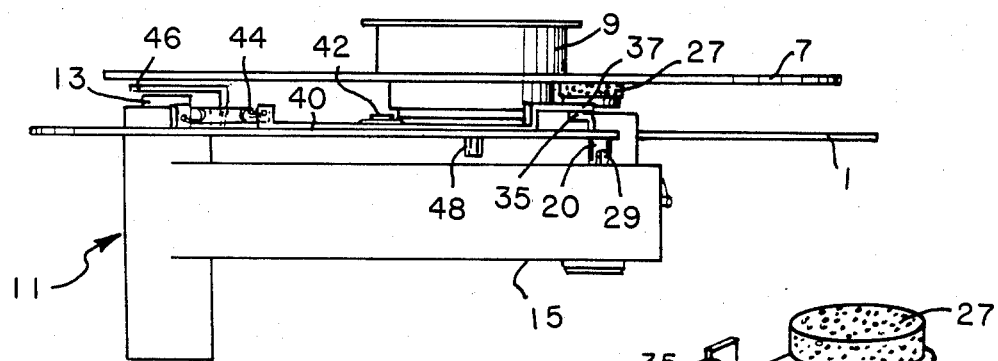
FIG. 5 is a side elevation as viewed from line V—V in FIG. 1.
Figure 6:
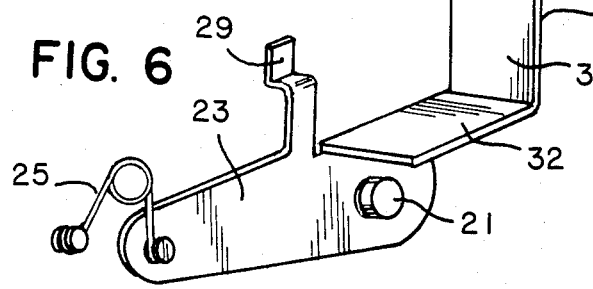
FIG. 6 is a perspective view in detail of an embodiment of the cleaning means of the present invention.

The cleaning device of the present invention includes a disc cleaning means which is rotatably secured to the arm 15 by a pin 21, which arm also carries the laser 13. The cleaning means includes a lever 23 (as more clearly seen in FIGS. 3, 4 and 6) which is subject to the action of a biasing means 25 secured to both the arm 15 and the lever 23. The biasing means is generally a spring and preferably, as illustrated in FIG. 6, is an over-center device such as a toggle switch. The disc cleaning means, particularly lever 23, rotates in a plane which is substantially perpendicular to the plane of rotation of arm 15, which arm rotates in a plane parallel to the plane of rotation of the disc. The cleaning means also includes cleaning element or member 27 affixed to the lever 23 by means of a stepped member 31 (FIG. 6), which stepped member is formed from two parallel plates 32 and 34 connected by a plate 33. Although lever 23 and stepped member 31 may be formed as separate parts rigidly connected to one another, they may be formed as a single unit by unitary construction. The lever/stepped member unit(s) may be formed from a suitable rigid or semi-rigid plastic material or from suitable sheet metal such as steel, non-ferrous metal or ferrous alloy.

Figure 1:
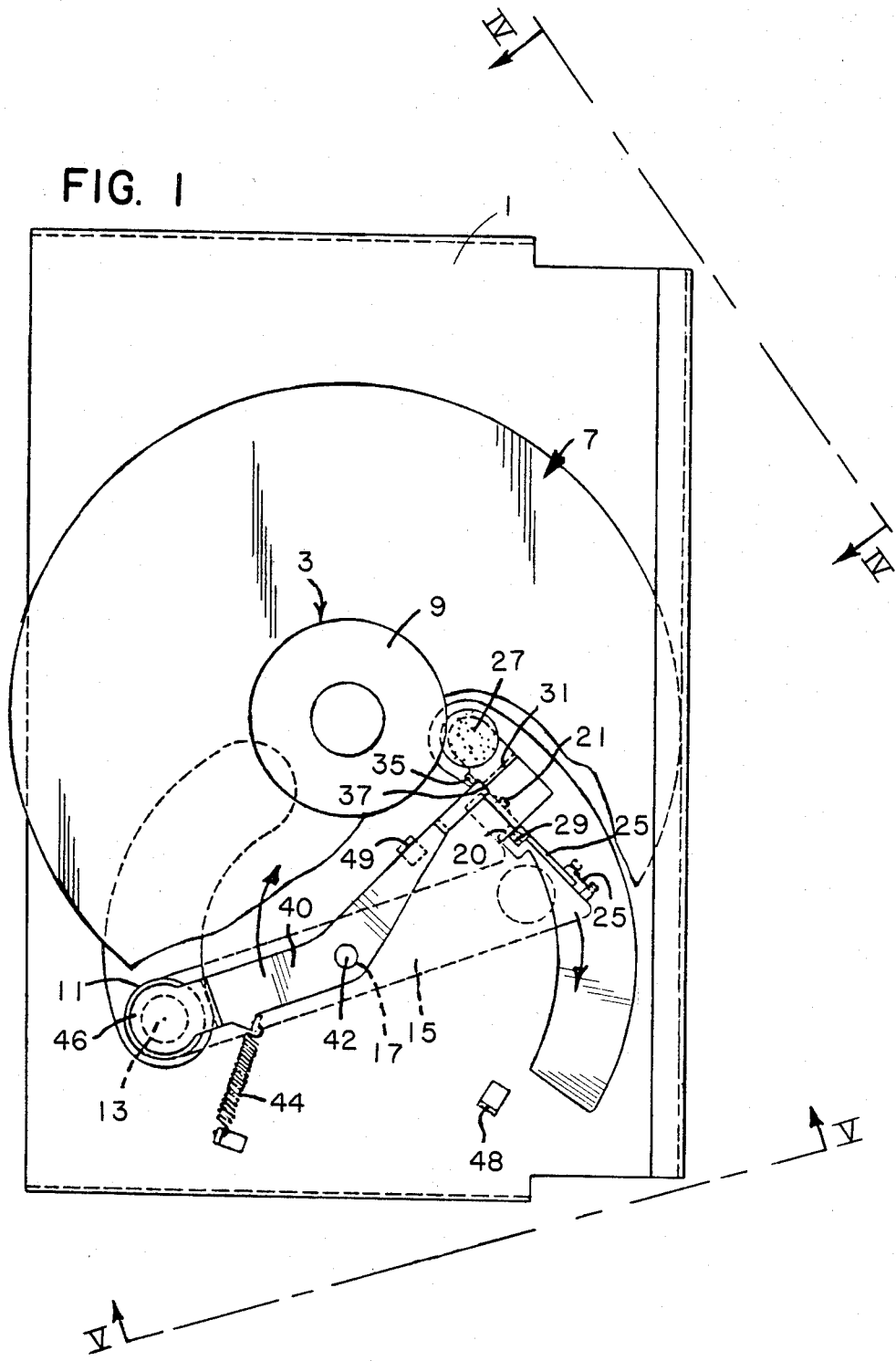
FIG. 1 represents a plan view of an embodiment of the cleaning device of the present invention in the environment of a laser reproduction system at the beginning of a cleaning phase or mode.

The cleaning device of the present invention is rendered operative under the normal conditions of information recording or reproduction. In all instances, the cleaning mode precedes a recording or reproduction mode. In operation, a record 7 is positioned on the support plate 5 and locked into place by the securing member 9, followed by operation of the motor 3. By regulation of the magnetic field, the arm 15 carrying the laser 13 is brought into the position illustrated (in continuous lines) in FIG. 1. In this position, the laser is inoperative and the disc cleaning device is about to become operative. A means is provided for operatively associating the disc cleanig means with a surface of the disc. As the information reading or recording apparatus bearing arm 15 moves counterclockwise and approaches the end of its range of motion in that direction, a projection 20, such as a tab, rod, bar, etcetera, on the base 1 coacts with another projection 29, such as a tab, bar, etcetera, carried by the lever 23 in such a manner as to cause this lever to pivot and to bring it into the position shown in FIG. 4. Contact of the tab 29 with the corresponding tab 20 causes pivoting of the lever 23, bringing cleaning member 27 into contact with a surface of the record 7. Biasing means 25 maintains lever 23 in this position throughout the cleaning mode. Through progressive control of the magnetic field of the recording/reproduction apparatus, the arm 15 is progressively moved radially outward in a clockwise rotational movement so that the cleaning element 27 cleans the rotating record from its center towards its periphery. Arm 15, carrying laser 13, is now in the proper position to begin disc reading or recording.

One important embodiment of the present invention, when a cleaning device is used with a laser recording/reproduction system, is the provision of a means for covering the beam emitting end, i.e., the portion of the laser closest to the disc surface, while the cleaning means is in operation. The covering means comprises an elongated member 40 which is another lever, such as a plate, rotatable about a pin or post 42 which is secured to the base 1. The elongated member includes a covering end 46, which is slightly raised and slightly greater in width than most of the elongated member, and an engaging end 37. The plate 40, rotatable in a plane intermediate the disc 7, or its securing means 5, and the beam emitting end of the laser, obturates or covers the laser beam and its optical system 13 by means of the raised end 46 in such a manner that no dirt can fall onto the optical system.

A means of engaging the covering means comprises a projection 35, such as a tab, bar, etcetera, located on plate 34 of stepped member 31, which projection engages the end 37 of lever 40 while the lever 23 of the cleaning means is in a raised and operative or cleaning mode. Thus, while lever 23, which has been pivoted in one plane, is in an operative disc engaging mode, the rotatable plate 40 bearing covering end 46, is caused to rotate in another plane which is parallel to that in which arm 15 moves and substantially perpendicular to the plane in which lever 23 rotates.

Figure 2:
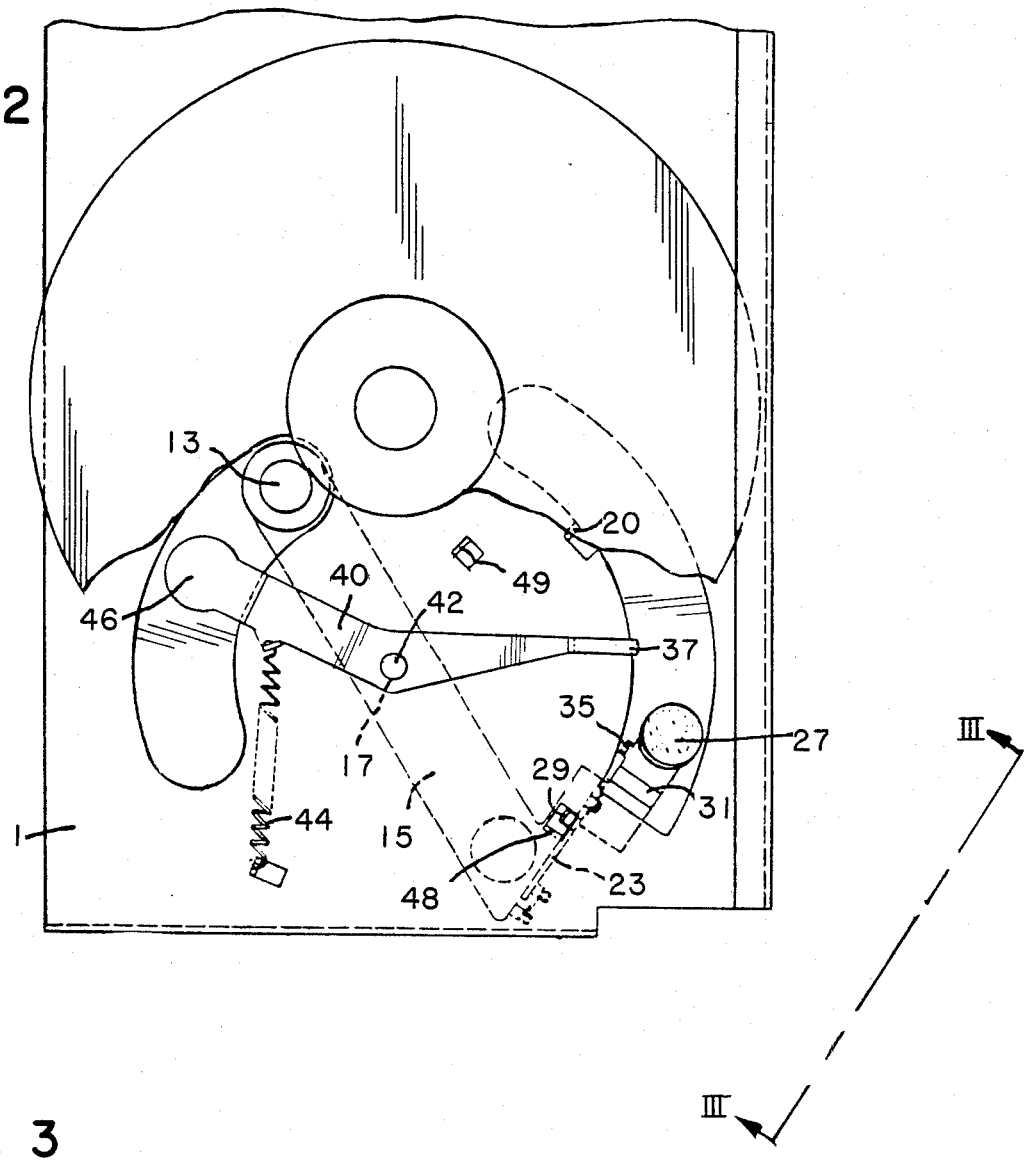
FIG. 2 is a view similar to that shown in FIG. 1, the cleaning device being in an inoperative mode while the means for reproducing and/or recording information is in an operative mode.

Once the surface of the record 7 has been cleaned, a means for disassociating the disc cleaning means from the surface of the disc operates to remove the cleaning element from the disc surface and to restore the disc cleaning means to its original position. In one embodiment of the present invention, the means for disassociating the disc cleaning means from the surface of the disc also serves as a means to disengage the covering means from rotation with the arm 15 in which it covers the optical system of the laser 13. Thus, when the surface of the record has been cleaning and the arm 15 has been brought into the position shown in FIG. 2, an extending member 48, such as a stop or tab located on the base, acts on the tab 29 of the lever 23 so as to cause the latter to pivot downwards (FIG. 3). As a result of this motion, the cleaning member 27 is moved out of contact and away from the surface of the disc and, under the action of the biasing means or spring 44, plate 40 returns to the position illustrated in FIG. 1, its movement being halted by projecting member 49, such as a tab or stop, so that the laser beam can begin its information recording or reproduction phase, moving progressively from the center towards the periphery of the disc.

Although the form of the embodiment illustrated in the drawings and described above, using a pivoting arm 15 which carries the laser, has been given by way of example, any other means of recording and/or reproduction and any other means used to move the recording and/or reproduction means may be used. This would include a carriage means or arm with lateral displacement.

I claim:

1. In an apparatus for transferring information to or from a disc, which apparatus includes a base, means for rotating the disc, means for transferring information to or from the disc, said information transferring means held by an arm movably mounted on the base to shift said information transferring means across the surface of the disc in one direction or the opposite direction between the periphery and substantially the center, a disc cleaning device comprising:
   means for cleaning the disc mounted movably on said arm;
   means for moving said disc cleaning means into a disc-contacting cleaning position on a surface of the disc when said information transferring means is in an inoperative mode and for moving said disc cleaning means while in a cleaning position across the surface of the disc in one direction while said information transferring means is shifted across the surface of the disc in the opposite direction and remains in an inoperative mode; and
   means for disassociating said disc cleaning means from the surface of the disc when said information transferring means is in an operative mode.

2. The disc cleaning device of claim 1 wherein the disc and said disc cleaning means are supported on substantially perpendicular axes of rotation.

3. The disc cleaning device of claim 1 wherein said information transferring means comprises a stylus.

4. The disc cleaning device of claim 1 wherein said information transferring means comprises a laser.

5. The disc cleaning device of claim 4 wherein said laser has a beam emitting end and said disc cleaning means includes a means for covering the beam emitting end of said laser when said disc cleaning means is operatively associated with the disc.

6. The disc cleaning device of claim 5 wherein said covering means comprises:
   an elongated member pivotally mounted on said base, said elongated member operatively interposed between said arm and a surface of the disc;
   means for operatively engaging said covering means; and
   means for disengaging said covering means.

7. The disc cleaning device of claim 6 wherein said means for engaging said covering means comprises a projecting member on said disc cleaning means capable of engaging a portion of said elongated member.

8. The disc cleaning device of claim 7 wherein said means for disengaging means covering means comprises:
   a biasing means secured to said base and to said elongated member; and
   a first projecting member on said disc cleaning means capable of coacting with a second projecting member on said base, whereby engagement of said first projecting member with said second projecting member causes rotation of said disc cleaning device and disengagement of said first projection with said second projection, thereby releasing said elongated member.

9. In an apparatus for transferring information to or from a disc, which apparatus includes a base, means for rotating the disc, means for transferring information to or from the disc, an arm movably mounted on the base for supporting said information transferring means, a disc cleaning device comprising:
   a lever rotatably mounted on said arm and having a cleaning pad attached;
   a first projection on said lever adapted to contact a second projection on said base, the contact of said first projection with said second projection causing rotation of said lever and said pad to a disc-contacting cleaning position when said information transferring means is in an inoperative mode; and
   means for rotating said lever to disassociate said pad from the surface of the disc when said information transferring means is in an operative mode.

10. The disc cleaning device of claim 9 wherein said operatively associating means further comprises a means for biasing said lever against the disc in a disc-contacting cleaning position.

11. In an apparatus for transferring information to or from a disc, which apparatus includes a base, means for rotating the disc, means for transferring information to or from the disc, an arm movably mounted on the base for supporting said information transferring means, a disc cleaning device comprising:
   a lever rotatably mounted on said arm and having a cleaning pad attached;
   means for rotating said lever to move said disc cleaning pad into a disc-contacting cleaning position when said information transferring means is in an inoperative mode; and
   means for biasing said lever to a position in which said pad is separated from contact with the disc when said information transferring means is in an operative mode.

12. In an apparatus for transferring information to or from a disc, which apparatus includes a base, means for rotating the disc, a laser for transferring information to or from the disc, an arm movably mounted on the base for supporting said laser, a disc cleaning device comprising:
   means for cleaning the disc mounted rotatably on said arm;
   means for operatively associating said disc cleaning means with the surface of the disc when said laser is in an inoperative mode;
   means for disassociating said disc cleaning means from the surface of the disc when said laser is in operative mode;
   said laser having a beam-emitting end and said disc cleaning means including a means for covering the beam-emitting end of said laser when said disc cleaning means is operatively associated with the disc;

said covering means comprising:

an elongated member pivotally mounted on said base, said elongated member operatively interposed between said arm and a surface of the disc;

means for engaging said covering means comprising a projecting member on said disc cleaning means capable of engaging a portion of said elongated member; and means for disengaging said covering means comprising:

a biasing means secured to said base and to said elongated member; and a first projecting member on said disc cleaning means capable of coacting with a second projecting member on said base whereby engagement of said first projecting member with said second projecting member causes rotation of said disc cleaning means and disengagement of said first projection from said second projection, thereby releasing said elongated member.

* * * * *